US011905930B2

(12) United States Patent
Asakawa

(10) Patent No.: US 11,905,930 B2
(45) Date of Patent: Feb. 20, 2024

(54) OUTPUT DEVICE, CONDITION MONITORING DEVICE, WIND TURBINE, OUTPUT METHOD, CONDITION MONITORING METHOD AND NON-TRANSITORY COMPUTER-READABLE STORAGE MEDIUM STORING PROGRAM

(71) Applicant: NABTESCO CORPORATION, Tokyo (JP)

(72) Inventor: Yuichi Asakawa, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 17/466,687

(22) Filed: Sep. 3, 2021

(65) Prior Publication Data

US 2022/0074387 A1   Mar. 10, 2022

(30) Foreign Application Priority Data

Sep. 4, 2020   (JP) ................................. 2020-149147

(51) Int. Cl.
*F03D 7/02* (2006.01)
*F03D 17/00* (2016.01)

(52) U.S. Cl.
CPC ........... *F03D 7/0248* (2013.01); *F03D 7/022* (2013.01); *F03D 7/0204* (2013.01); *F03D 7/028* (2013.01);
(Continued)

(58) Field of Classification Search
CPC ...... F03D 7/0248; F03D 7/0204; F03D 7/022; F03D 7/0264; F03D 7/028; F03D 7/0244;
(Continued)

(56) References Cited

U.S. PATENT DOCUMENTS

2015/0132128 A1* 5/2015 Zaib ........................ F03D 7/024
416/37
2019/0293055 A1* 9/2019 Nohara .................... F03D 80/88
(Continued)

FOREIGN PATENT DOCUMENTS

CN   111452629 A   7/2020
EP   3124788 A1   2/2017
(Continued)

OTHER PUBLICATIONS

Office Action dated May 16, 2022, issued in corresponding German Patent Application No. 10 2021 122 728.3 with English translation (9 pgs.).
(Continued)

*Primary Examiner* — Christopher Verdier
(74) *Attorney, Agent, or Firm* — Pillsbury Winthrop Shaw Pittman, LLP

(57) ABSTRACT

For each of actuators, the partial load ratio is output. An output device for a drive device of a wind turbine includes an obtaining unit for obtaining information relating to a load applied to each of a plurality of actuators, where the actuators are included in the drive device of the wind turbine and configured to cooperate with each other, a processing unit for, based on the information obtained by the obtaining unit, calculating a partial load ratio, where the partial load ratio represents a ratio of a load on each of the actuators to a total load and the total load is a sum of the loads on the respective actuators, and an output unit for outputting the partial load ratio.

9 Claims, 7 Drawing Sheets

(52) U.S. Cl.
CPC ......... *F03D 7/0208* (2013.01); *F03D 7/0264* (2013.01); *F03D 17/00* (2016.05); *F05B 2260/80* (2013.01); *F05B 2260/902* (2013.01); *F05B 2260/903* (2013.01); *F05B 2270/331* (2013.01); *F05B 2270/332* (2013.01)

(58) Field of Classification Search
CPC ...... F03D 7/0208; F03D 7/0212; F03D 17/00; F05B 2260/80; F05B 2260/902; F05B 2270/331; F05B 2270/602; F05B 2260/90; F05B 2260/903; F05B 2270/30; F05B 2270/332
See application file for complete search history.

(56) References Cited

U.S. PATENT DOCUMENTS

| | | | | |
|---|---|---|---|---|
| 2021/0199088 A1* | 7/2021 | Nohara | ................ | F03D 7/0244 |
| 2021/0199089 A1* | 7/2021 | Kodama | ............... | F03D 7/0248 |

FOREIGN PATENT DOCUMENTS

| | | | |
|---|---|---|---|
| EP | 2859223 | B1 | 5/2018 |
| JP | 2015-140777 | A | 8/2015 |

OTHER PUBLICATIONS

First Office Action dated Sep. 27, 2023, issued in corresponding Chinese Patent Application No. 202111031884.3 with English translation (23 pgs.).

\* cited by examiner

OUTPUT DEVICE, CONDITION MONITORING DEVICE, WIND TURBINE, OUTPUT METHOD, CONDITION MONITORING METHOD AND NON-TRANSITORY COMPUTER-READABLE STORAGE MEDIUM STORING PROGRAM

CROSS-REFERENCE TO RELATED APPLICATIONS

This application is based on and claims the benefit of priority from Japanese Patent Application Serial No. 2020-149147 (filed on Sep. 4, 2020), the contents of which are hereby incorporated by reference in their entirety.

TECHNICAL FIELD

The present invention relates to an output device, a condition monitoring device, a wind turbine, an output method, a condition monitoring method, and a non-transitory computer-readable storage medium storing program.

BACKGROUND

Some of conventionally known wind power generation devices have a yaw control function for adjusting the orientation of the blades in accordance with the wind direction. An example of such wind power generation devices is disclosed in Japanese Patent Application Publication No. 2015-140777 ("the '777 Publication"). The wind power generation device disclosed in the '777 Publication is installed on the land or on the ocean, and it includes a tower serving as a support post for a power generator, a nacelle disposed on top of the tower and having the power generator enclosed therein, and a rotor disposed on one of the ends of the nacelle and made up by a hub and a blade for receiving wind and converting the received wind into rotational energy. The wind power generation device performs yaw control or controls the position of the nacelle and rotor relative to the tower, by allowing a yaw bearing gear, which is provided on the tower, and pinion gears of a plurality of yaw actuators, which are provided on the nacelle, to mesh with each other and driving the yaw actuators.

Among the actuators, only one or some of them may be damaged while the other actuators are intact. The inventors of the present invention investigated the reason and have found that the ratio of the load on each actuator to the total load, which is obtained by summing up the loads on the actuators, (may be referred to as the partial load ratio) might not be equal. The inventors have also discovered that, if the partial load ratio is uneven, a specific one of the actuators with a high partial load ratio may face the risk of breakage when such an actuator suddenly receives a high load caused by, for example, gust of wind. For the reasons stated above, it is required to output the partial load ratio of each actuator in order to monitor the partial load ratio of a specific one of the actuators and prevent an increase in partial load ratio of a specific one of the actuators.

SUMMARY

The present invention has been made in view of such circumstances, and an object of the present invention is to output the partial load ratio of each actuator.

The present invention is related to an output device for a drive device of a wind turbine. The output device includes an obtaining unit for obtaining information relating to a load applied to each of a plurality of actuators, where the actuators are included in the drive device of the wind turbine and configured to cooperate with each other, a processing unit for, based on the information obtained by the obtaining unit, calculating a partial load ratio, where the partial load ratio represents a ratio of the load on each of the actuators to a total load and the total load is a sum of the loads on the respective actuators, and an output unit for outputting the partial load ratio.

In the output device for the driving device of the wind turbine according to the present invention, the obtaining unit may obtain information relating to the load applied to each of the actuators while the drive device is in operation.

In the output device for the driving device of the wind turbine according to the present invention, the obtaining unit may obtain information relating to the load applied to each of the actuators while the drive device is suspended.

The present invention is related to a condition monitoring device for a drive device of a wind turbine. The condition monitoring device includes an obtaining unit for obtaining information relating to a load applied to each of a plurality of actuators, where the actuators are included in the drive device of the wind turbine and configured to cooperate with each other, a processing unit for, based on the information obtained by the obtaining unit, calculating a partial load ratio, where the partial load ratio represents a ratio of the load on each of the actuators to a total load and the total load is a sum of the loads on the respective actuators, and a diagnosing unit for diagnosing a condition of each of the actuators based on the total load and the partial load ratio calculated by the processing unit.

In the condition monitoring device for the drive device of the wind turbine according to the present invention, the obtaining unit may be a torque sensor.

The condition monitoring device for the drive device of the wind turbine according to the present invention may include a brake for applying a braking force to the actuators, and a drive control unit for controlling the brake based on a diagnosis made by the diagnosing unit.

The condition monitoring device for the drive device of the wind turbine according to the present invention may include a display unit for displaying the information obtained by the obtaining unit using a graph plotted by taking the partial load ratio along an axis and the total load along another axis.

In the condition monitoring device for the drive device of the wind turbine according to the present invention, the display unit may display on the graph a line indicating an upper limit of an allowable partial load ratio for each of the actuators determined by the total load.

The present invention is related to a wind turbine including a drive device including a plurality of actuators configured to cooperate with each other, a wind turbine body including a moving part configured to be driven by the drive device, and a condition monitoring device for the drive device of the wind turbine. The condition monitoring device includes an obtaining unit for obtaining information relating to a load applied to each of the plurality of actuators, a processing unit for, based on the information obtained by the obtaining unit, calculating a partial load ratio, where the partial load ratio represents a ratio of a load on each of the actuators to a total load and the total load is a sum of the loads on the respective actuators, a diagnosing unit for diagnosing a condition of the drive device based on the partial load ratio, and a drive control unit for controlling the drive device based on a diagnosis made by the diagnosing unit.

The present invention relates to a condition monitoring device including an obtaining unit for obtaining information relating to a load applied to each of a plurality of actuators, where the actuators are included in a drive device and configured to cooperate with each other, a processing unit for, based on the information obtained by the obtaining unit, calculating a partial load ratio, where the partial load ratio represents a ratio of a load on each of the actuators to a total load and the total load is a sum of the loads on the respective actuators, and a diagnosing unit for diagnosing a condition of each of the actuators based on the total load and the partial load ratio calculated by the processing unit.

The present invention is related to a condition monitoring method for a drive device of a wind turbine. The condition monitoring method includes steps of obtaining information relating to a load applied to each of a plurality of actuators, where the actuators are included in the drive device of the wind turbine and configured to cooperate with each other, based on the information obtained in the obtaining, calculating a partial load ratio, where the partial load ratio represents a ratio of a load on each of the actuators to a total load and the total load is a sum of the loads on the respective actuators, and diagnosing a condition of each of the actuators based on the total load and the partial load ratio calculated in the calculating, and based on a diagnosis made in the diagnosing, controlling the drive device.

According to the condition monitoring method for the drive device of the wind turbine according to the present invention, in the controlling, a brake for applying a brake force to the actuators may be controlled based on the diagnosis made in the diagnosing.

The present invention is related to a program for executing an output method for a drive device of a wind turbine. The program causes a computer to perform steps of obtaining information relating to a load applied to each of a plurality of actuators, where the actuators are included in the drive device of the wind turbine and configured to cooperate with each other, based on the information obtained in the obtaining, calculating a partial load ratio, where the partial load ratio represents a ratio of a load on each of the actuators to a total load and the total load is a sum of the loads on the respective actuators, and outputting the partial load ratio.

Advantageous Effects

According to the present invention, the partial load ratio of each actuator can be output.

DESCRIPTION OF THE PREFERRED EMBODIMENTS

Figure 1:
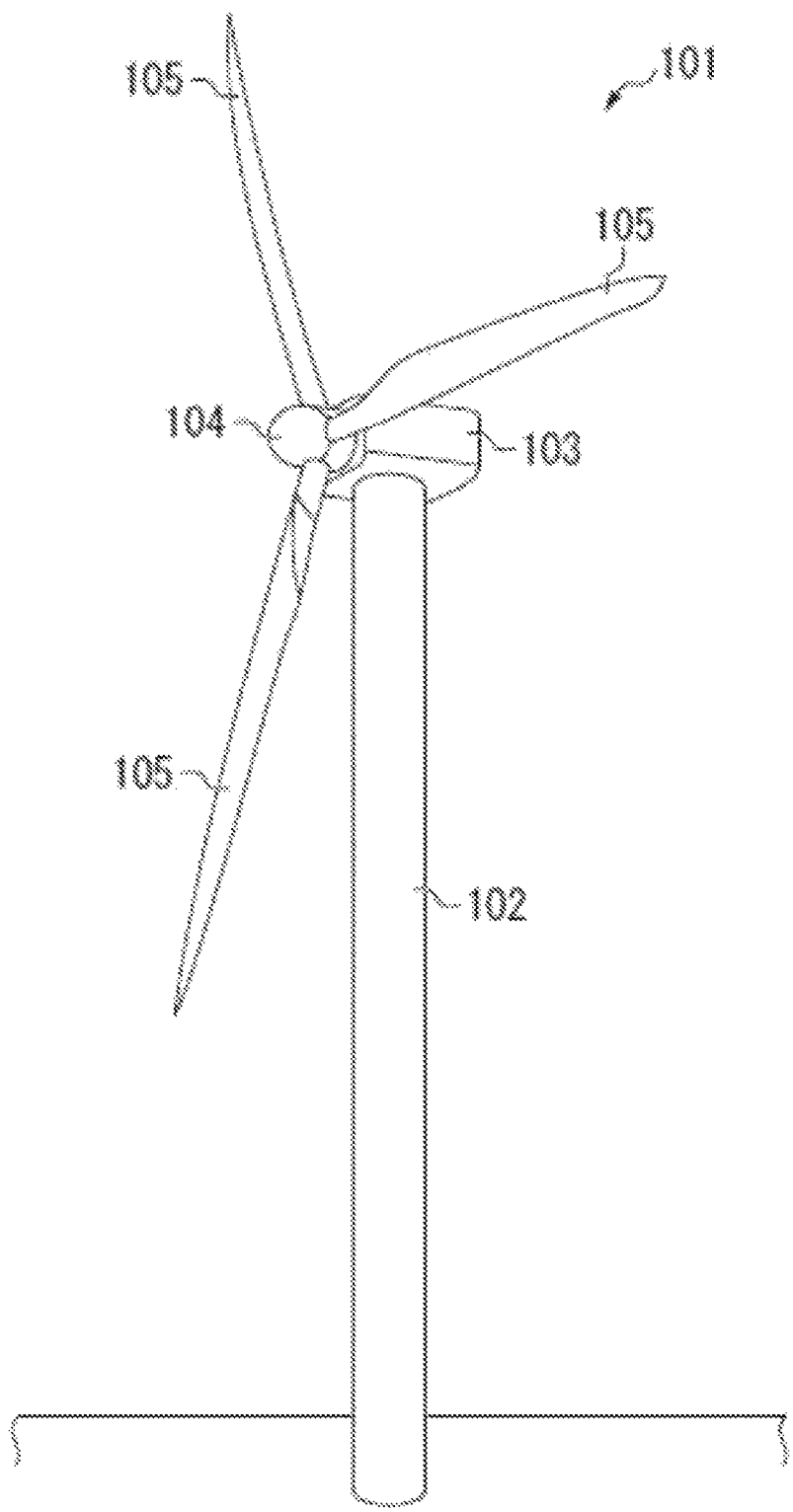
FIG. 1 is a perspective view showing an example configuration of a wind turbine according to an embodiment of the invention.

Embodiments of the present invention will now be described in detail with reference to the appended drawings. In the description of the following embodiment, an output device, and a condition monitoring device for, for example, a drive device of a wind turbine will be described. The output and condition monitoring devices are, however, not only applicable to the wind turbine drive device but also to a wide range of drive devices including a drive device provided with a plurality of actuators cooperating with each other. FIG. 1 is a perspective view showing an example configuration of a wind turbine 10. The wind turbine 10 includes a wind turbine body 101. The wind turbine body 101 includes a tower 102, a nacelle 103, a rotor (main shaft part) 104, and a plurality of blades (vanes) 105. The tower 102 extends vertically upward from the land or the sea.

The wind turbine 10 includes a drive device in addition to the wind turbine body 101. The wind turbine body 101 includes a moving part configured to be driven by the drive device. In the present embodiment, the nacelle 103 is attached to the top of the tower 102 such that the nacelle 103 is rotatable relative to the tower 102. In other words, the connecting portion between the tower 102 and the nacelle 103 constitutes the moving part configured to rotate the nacelle 103 relative to the tower 102. The drive device is configured to drive the moving part, which in turn rotates the nacelle 103 relative to the tower 102. For example, the drive device is placed within the nacelle 103. The drive device specifically includes a plurality of actuators configured to cooperate with each other. The actuators coordinately operate to rotate the nacelle 103 around the longitudinal axis of the tower 102. In this manner, the nacelle 103 rotates in the yaw direction (YAW) relative to the tower 102.

The rotor 104 rotates in the roll direction (ROLL) on the nacelle 103. The plurality of (e.g., three) blades 105 are provided on the rotor 104 at equal angles relative to each other, such that they extend radially from the axis of the roll.

Figure 2:
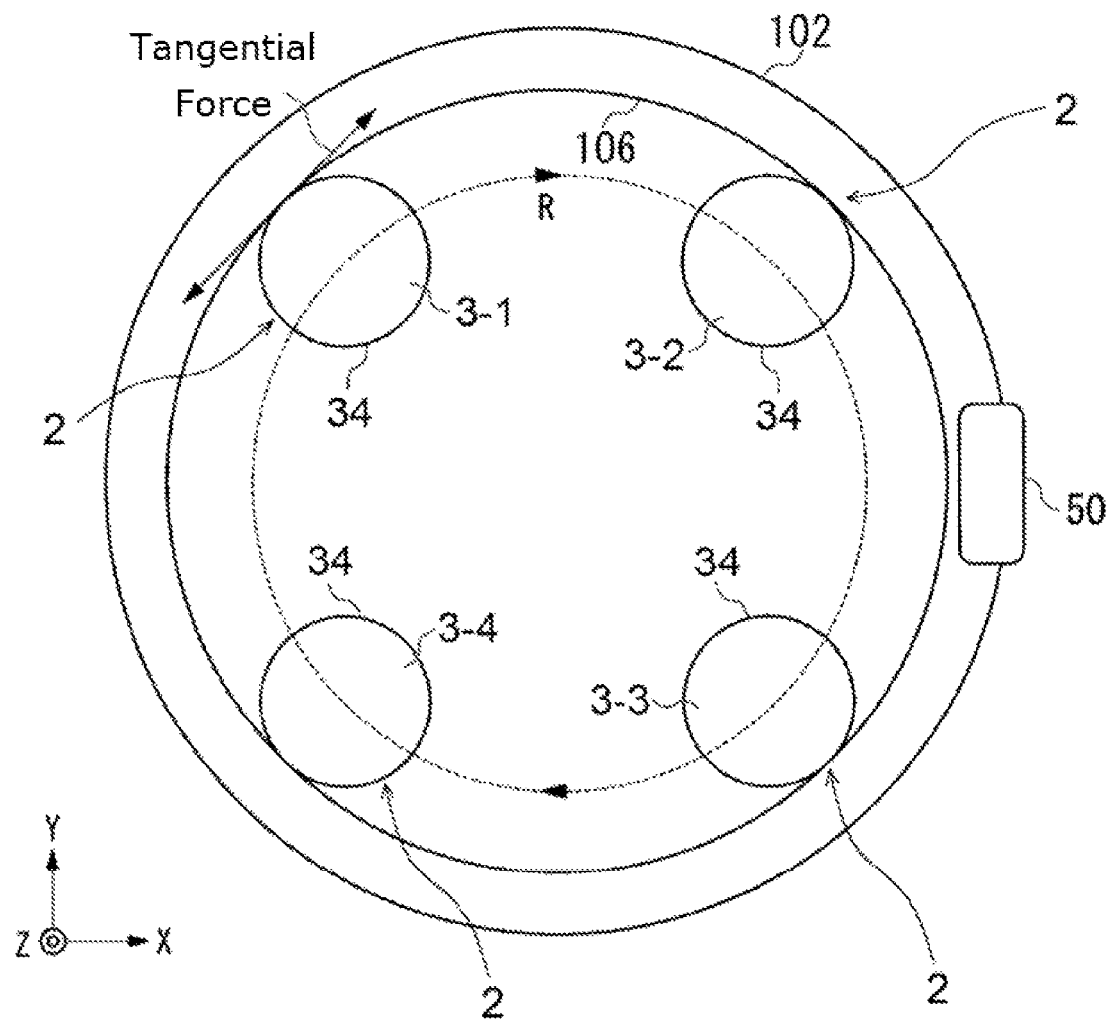
FIG. 2 is a top view showing the relation between a tower and a drive device according to the embodiment.

FIG. 2 is a top view showing the relationship between the tower 102 and the actuators 3 included in the drive device 2 according to the embodiment. The actuators 3 for generating yaw drive force are attached to the nacelle 103. In the present embodiment, four actuators 3-1, 3-2, 3-3, and 3-4 are attached to the nacelle 103. In the following description, the actuators are collectively referred to as "the actuators 3." The actuators 3 are configured to drive a driving target part. In the present embodiment, the driving target part to be driven by the actuators 3 is a ring gear 106. In the example shown in FIG. 2, the ring gear 106 is formed in the inner wall of the tower 102. In this case, the ring gear 106 is a member having multiple internal teeth on its inner periphery. Although not shown, the ring gear 106 may be alternatively a member having multiple external teeth on its outer periphery. The ring gear 106 meshes with pinions 34 of the actuators 3. The actuators 3 are rotated by a motor drive force in the R direction in FIG. 2. The actuators 3 may be also rotatable in the opposite direction to the R direction.

With the ring gear 106 and the pinions 34 meshing with each other, a force such as a gust of wind may be applied to the nacelle 103, the tower 102 or the like. This generates a tangential force between the ring gear 106 and the pinions 34. The tangential force is a force acting in the tangential direction of the gear forming surface of the ring gear 106. The tangential force applies a torsional stress to a speed reducing unit of each of the actuators 3. The tangential force also applies a tensile stress, a compressive stress, and a bending stress to a fastener in each of the actuators 3. In the embodiment, the ring gear 106 is provided in the tower 102 and the actuators 3 are fixedly attached to the nacelle 103, but the present invention is not limited to such an example. Alternatively, the nacelle 103 may include a gear part corresponding to the ring gear 106, and the tower 102 may include actuators corresponding to the actuators 3.

In the wind turbine body 101, a yaw unit configured to cause the nacelle 103 to yaw relative to the tower 102 includes a brake for applying a brake force to the driving target part, which is to be driven by the actuators 3. In the present embodiment, the yaw unit includes a hydraulic brake for applying a braking force to the ring gear 106, which constitutes the driving target part. The hydraulic brake is, for example, a caliper brake mechanism. The hydraulic brake includes a hydraulic brake driving unit, not shown, and a friction member 50, shown in FIG. 2. The hydraulic brake driving unit moves the friction member 50 in the Z direction shown in FIG. 2 (the direction in which a shaft 33 of each actuator 3 extends, the shaft 33 will be described below) in accordance with a control signal fed from outside. The hydraulic brake driving unit applies a braking force to the ring gear 106 by urging the friction member 50 against the ring gear 106. The wind turbine 10 is preferably capable of adjusting the braking force to be applied to the ring gear 106.

Figure 3:
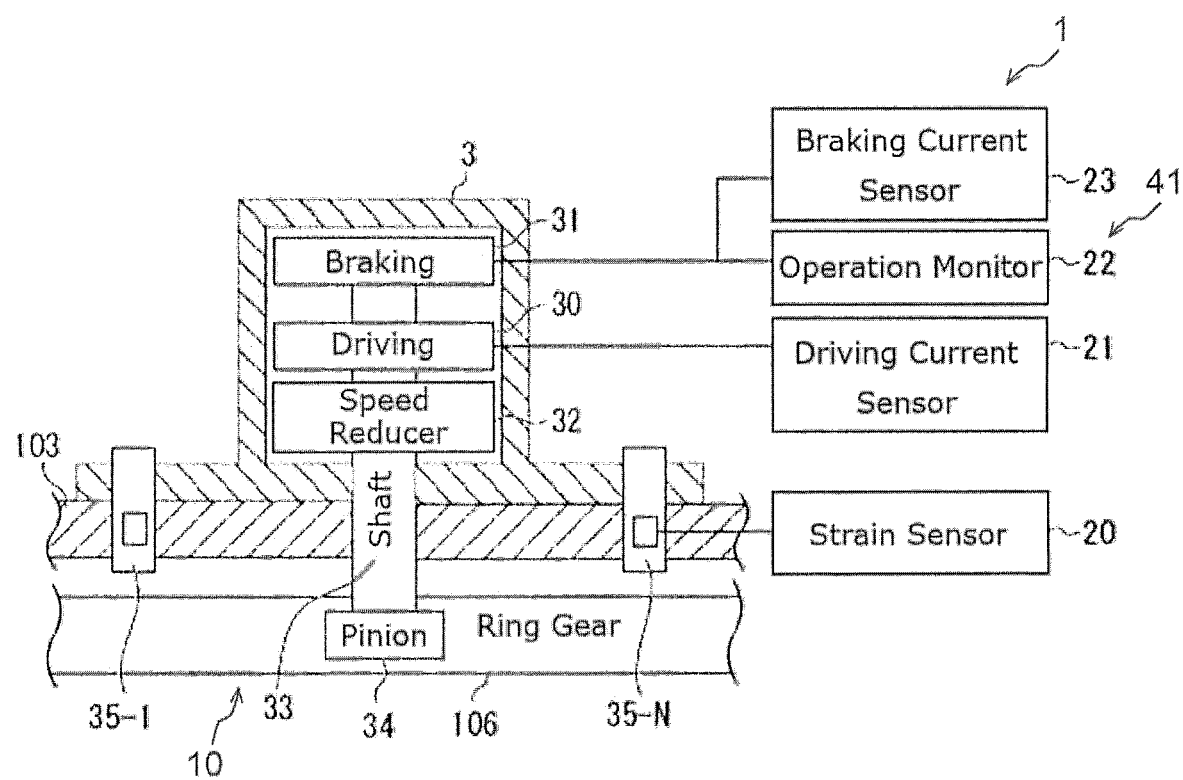
FIG. 3 illustrates an example configuration of an obtaining unit and an actuator according to the embodiment.

FIG. 3 shows an example configuration of each actuator 3, together with an example configuration of an obtaining unit 41 configured to obtain information relating to load applied to the actuator 3. In the example shown in FIG. 3, the ring gear 106 is positioned on the top portion of the tower 102.

The actuators 3 are fixedly attached to the nacelle 103 of the wind turbine body 101 with N bolts 35 (N is an integer greater than or equal to 2). The N bolts 35 are arranged annularly.

Each actuator 3 includes a drive unit 30, a brake unit 31, a speed reducer 32, a shaft 33, and a pinion 34. The speed reducer 32 includes gears serving as a speed reducing mechanism. The pinion 34 is provided at the end of the shaft 33 such that it can mesh with the ring gear 106. The bolts 35-1 to 35-N are members for fixedly attaching the actuators 3 to the nacelle 103. The bolts 35 undergo strain depending on the moment caused by external load such as wind.

The drive unit 30 is a motor. The drive unit 30 rotates the shaft 33 about the longitudinal direction of the shaft 33 in accordance with the electric current supplied to the drive unit 30. A condition monitoring device 1 includes a brake for applying a braking force to the actuators 3. In the present embodiment, the brake unit 31 of each actuator 3 is configured to reduce the rotational speed of the shaft 33 via an electromagnetic brake. If such is the case, the electromagnetic brake of the brake unit 31 corresponds to the brake configured to apply a braking force to the actuators 3. The brake unit 31 may use the electromagnetic brake to maintain the suspended state of the rotation of the shaft 33. The speed reducer 32 uses the gears included in the speed reducer 32 to set the rotational speed of the shaft 33.

As driven by the drive unit 30, the shaft 33 rotates at a rotational speed that is determined by the speed reducer 32. As driven by the drive unit 30, the shaft 33 rotates with a predetermined torque (shaft torque). The pinion 34 rotates while meshing with the internal teeth of the ring gear 106, in accordance with the amount of rotation of the shaft 33. This allows the nacelle 103 to rotate in the yaw direction relative to the tower 102.

Figure 4:
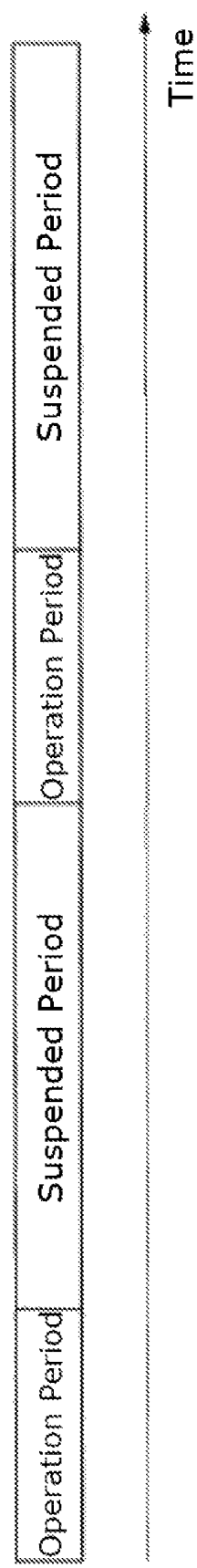
FIG. 4 shows a period in which the drive device is in operation and a period in which the drive device is suspended, in accordance with the present invention.
Figure 6:
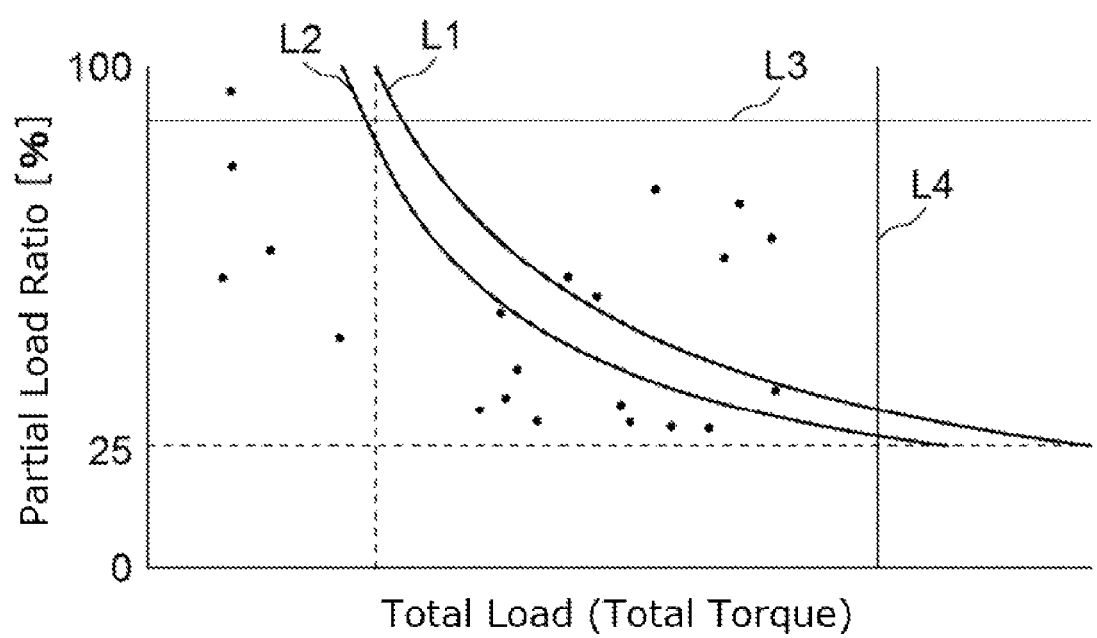
FIG. 6 shows, as an example, a graph displayed on a display unit according to the embodiment.

FIG. 4 shows periods in which the drive device 2 is in two different modes, in accordance with the present embodiment. The wind turbine 10 is in different modes between an operation period in which the drive device 2 is in operation and a suspended period in which the drive device 2 is suspended, as shown in FIG. 6, for example. In the operation period, the orientation of the nacelle 103 is moved based on the direction of wind. In the suspended period, the orientation of the nacelle 103 is stationary. During the operation period, the drive device 2 moves the nacelle 103 to a target position relative to the tower 102. During the suspended period, the drive device 2 keeps the nacelle 103 stationary at the target position relative to the tower 102. The target position is the optimal position of the nacelle 103 relative to the tower 102 determined based on the wind direction.

At the start timing of the operation period, the drive device 2 moves the nacelle 103 to the target position relative to the tower 102. The drive device 2 positions the nacelle 103 at the target position by the end timing of the operation period. The drive device 2 generates a braking force to keep the nacelle 103 stationary at the target position during the suspended period.

Figure 5:
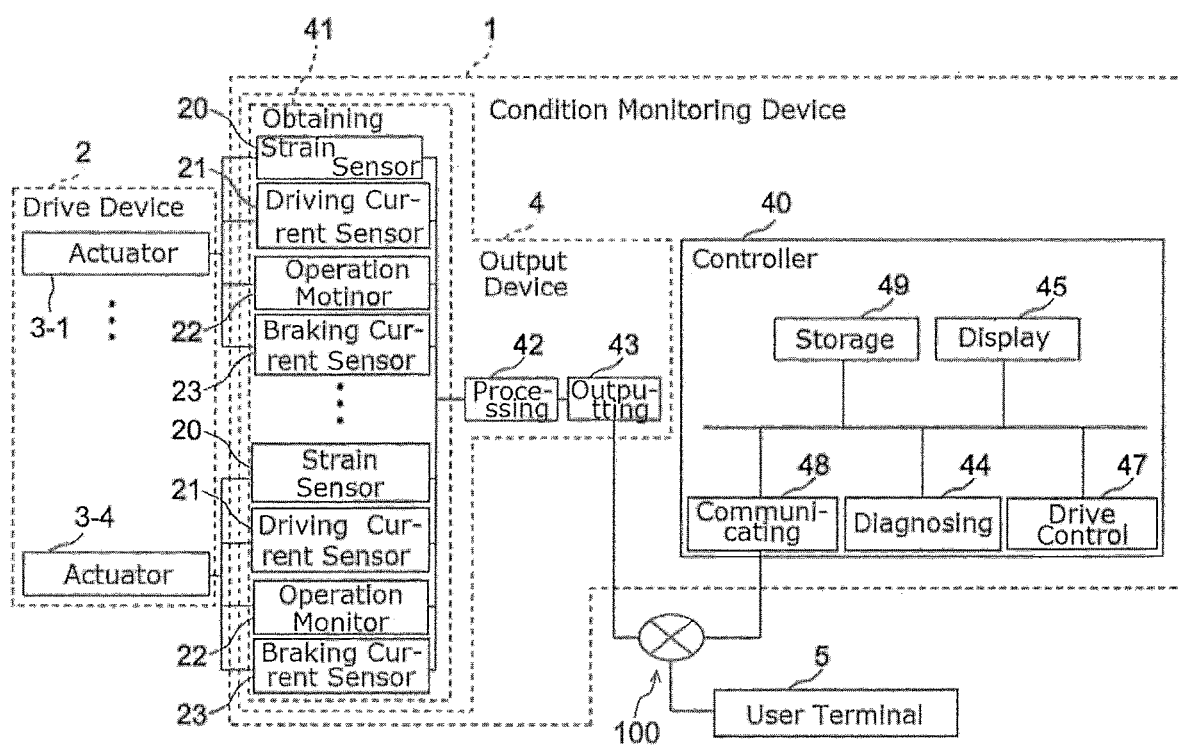
FIG. 5 illustrates an example configuration of a condition monitoring device according to the embodiment.

The wind turbine 10 relating to the present embodiment includes a condition monitoring device 1 for monitoring the condition of the drive device 2. The condition monitoring device 1 monitors, for example, whether there is an irregularity in the drive device 2 as the condition of the drive device 2. FIG. 5 is a block diagram showing the drive device 2 and condition monitoring device 1 of the wind turbine 10. As shown in FIG. 5, the condition monitoring device 1 includes an output device 4 for outputting the partial load ratio, a display unit 45 for displaying the partial load ratio output from an output unit 43, a diagnosing unit 44 for diagnosing the condition of the drive device 2 based on the partial load ratio output from the output unit 43, and a drive control unit 47 for controlling the drive device 2. In the example shown in FIG. 5, the condition monitoring device 1 includes the output device 4 and a controller 40, and the controller 40 includes the diagnosing unit 44, the display unit 45, the drive control unit 47, a communicating unit 48 and a storage unit 49. The output device 4 and controller 40 are connected to a user terminal 5 via a communication line 100.

The output device 4 is configured to calculate and output the partial load ratio based on the obtained information. The output device 4 is included in, for example, the nacelle 103 of the wind turbine 10. The output device 4 includes an obtaining unit 41 for obtaining information relating to the load on each of the actuators 3, a processing unit 42 for calculating the partial load ratio based on the information obtained by the obtaining unit 41 and the output unit 43 for outputting the partial load ratio. In the present embodiment, the processing and output units 42 and 43 of the output device 4 are constituted by a programmable logic controller (PLC).

The obtaining unit 41 is configured to obtain information relating to the load applied to each of the actuators 3. Here, the term "load" includes the load applied onto each actuator 3 while the drive device 2 is in operation and the load applied onto each actuator 3 while the drive device 2 is suspended. This means that the load is generated while the drive device 2 is either in operation or suspended. While the drive device 2 is in operation, the actuator 3 receives load generated by the operation of the actuator 3 itself and load applied by an external force such as wind. While the drive device 2 is suspended, the actuator 3 receives load applied by an external force such as wind.

Here, the phrase "information relating to the load" indicates, for example, a physical quantity representing the load on the actuator 3 or other information used to calculate the physical quantity representing the load. The physical quantity representing the load is not limited in any particular manner, provided that it can be used to calculate the partial load ratio, which is described below, when measured. The physical quantity representing the load on the actuator 3 includes, for example, the torque of the shaft 33 of the actuator 3, the air gap amount of the brake unit 31, or the amount of current used for braking (hereinafter referred to as "brake current amount"). Here, the term "air gap" indicates the gap created in a friction board included in the brake unit 31. The torque of the shaft 33 of the actuator 3 while the drive device 2 is in operation can be derived based on, for example, the amount of current used to drive the drive unit 30 (hereinafter referred to as "drive current amount"). While the drive device 2 is suspended and thus no current is supplied to the drive unit 30, the torque of the shaft 33 of the actuator 3 can be derived, for example, based on the amount of strain of the bolt 35 determined by the moment.

For example, the obtaining unit 41 is a torque sensor. In the present embodiment, the obtaining unit 41 includes a torque sensor. Additionally, the obtaining unit 41 includes a current sensor. The obtaining unit 41 includes a plurality of torque sensors and a plurality of current sensors, corresponding to the respective actuators 3.

In the example shown in FIG. 3, the obtaining unit 41 includes, as the torque sensor, a strain sensor 20, which is configured to measure the amount of strain experienced by the bolts 35. The amount of strain herein refers to the amount of deformation. A strain sensor 20-*n* (n is an integer from 1 to N) is provided for a bolt 35-*n*. The strain experienced by each bolt 35 depends on the moment caused by rotation of the shaft 33. The strain sensor 20-*n* senses the amount of strain in the corresponding bolt 35-*n*.

In the example shown in FIG. 3, the obtaining unit 41 includes a driving current sensor 21 for detecting the amount of current fed to the drive unit 30 (the driving current amount) and a braking current sensor 23 for detecting the amount of current fed to the electromagnetic brake (brake) in the braking unit 31 (the braking current amount). The amount of current is the amount of electricity running in a unit time. In the example shown in FIG. 3, the obtaining unit 41 includes an operation monitor 22. The operation monitor 22 detects whether the electromagnetic brake is active or not (operation condition) in the brake unit 31.

In the present embodiment, the obtaining unit 41 includes an input terminal of the PLC. In the present embodiment, the input terminal is connected to the strain sensor 20, the driving current sensor 21 and the braking current sensor 23 of the obtaining unit 41.

The obtaining unit 41 is configured to obtain information relating to the load applied to each of the actuators 3 while the drive device 2 is in operation. For example, the obtaining unit 41 is configured to obtain the driving current amount detected by the driving current sensor 21, as the information relating to the load applied to each of the actuators 3 while the drive device 2 is in operation. Additionally, the obtaining unit 41 is configured to obtain information relating to the load applied to each of the actuators 3 while the drive device 2 is suspended. For example, the obtaining unit 41 is configured to obtain the amount of strain detected by the strain sensor 20, as the information relating to the load applied to each of the actuators 3 while the drive device 2 is suspended.

Although not shown, the obtaining unit 41 may include an input terminal and no sensors for detecting the load on each actuator 3, such as the torque and current sensors. In this case, the obtaining unit 41 may be connected to a sensor for detecting the load on each actuator 3, which is not included in the output device 4, and may be configured to obtain the information detected by the connected sensor.

The processing unit 42 is configured to calculate the partial load ratio of each actuator 3 based on the information obtained by the obtaining unit 41. For example, the processing unit 42 is configured to calculate a total load, which is the total of the loads on the respective actuators 3. The processing unit 42 then uses the calculated total load to calculate the partial load ratio, which represents the ratio of the load on each actuator 3 to the total load. When the obtaining unit 41 obtains the information to be used to derive the physical quantity representing the load, the processing unit 42 may use the information obtained by the obtaining unit 41 to calculate the physical quantities representing the load.

The output unit 43 is configured to output the partial load ratio calculated by the processing unit 42. The output unit 43 is, for example, constituted by an output terminal of a PLC. The output unit 43 is connected to, for example, the diagnosing and display units 44 and 45, which will be described below. In the present embodiment, the output unit 43 is connected to the diagnosing and display units 44 and 45 of the controller 40, via the communicating unit 48 of the controller 40, which will be described below. In this case, the output unit 43 outputs the partial load ratio to the diagnosing and display units 44 and 45 via the communicating unit 48.

The controller 40 is, for example, a server, a workstation, a personal computer, a tablet device, or a smartphone device. The controller 40 is installed, for example, in a company building where an administrator of the wind turbine 10 stays. In the present embodiment, the controller 40 includes the diagnosing unit 44, the display unit 45, the drive control unit 47, the communicating unit 48 and the storage unit 49.

The display unit 45, the diagnosing unit 44, the drive control unit 47, the communicating unit 48 and the storage unit 49 are capable of communicating with each other through a bus.

For example, the storage unit 49 stores thereon programs for causing the controller 40, which is a computer, to execute the condition monitoring method and output method for the drive device 2, which will be described below. A part or all of the diagnosing unit 44, drive control unit 47, and communicating unit 48 are implemented by a processor such as a CPU (central processing unit) executing the programs stored on the storage unit 49. For example, the storage unit 49 is a computer readable recording medium. The storage unit 49 is preferably formed of a non-volatile storage medium (non-transitory storage medium) such as a flash memory or a hard disk drive (HDD). The storage unit 49 may include a volatile storage medium such as a RAM (random access memory). A part or all of the diagnosing unit 44, drive control unit 47, and communicating unit 48 may be implemented by using hardware such as an LSI (large scale integration) or an ASIC (application specific integrated circuit).

The display unit 45 is configured to display the partial load ratio output from the output unit 43. The display unit 45 is, for example, a display device such as a liquid crystal display or an organic electro luminescence display. The display unit 45 may include a manipulation device such as a touch panel.

In the present embodiment, the display unit 45 is configured to display the information obtained by the obtaining unit 41 using a graph plotted by taking the partial load ratio along an axis and the total load along another axis. FIG. 6 shows, as an example, the graph displayed on the display unit 45. The graph shown in FIG. 6 is plotted along a vertical axis representing the partial load ratio and along a horizontal axis representing the total load. The points plotted on the graph each represent the partial load ratio of any one of the actuators 3 at a given timing and the total load at the given timing.

The display unit 45 may be configured to display the information relating to only one of the actuators 3 which exhibits the highest partial load ratio. In the example shown in FIG. 6, the points plotted on the graph each represent the partial load ratio of any one of the actuators 3 that exhibits the highest partial load ratio at a given timing and the total load at the given timing. For example, if the total load of the four actuators 3 shown in FIG. 2 at a first timing t1 is greater than the total load recorded at any timing prior to the first timing t1, a point is plotted on the graph that represents the partial load ratio of one of the actuators 3 at the first timing t1 and the total load at the first timing t1. In this case, if the actuator 3-1 exhibits the highest partial load ratio among the four actuators at the first timing t1, a point is plotted on the graph that represents the partial load ratio of the actuator 3-1 at the first timing t1 and the total load at the first timing t1. Since the display unit 45 is configured to display only the information relating to the actuator 3 exhibiting the highest partial load ratio, this enables the user to easily know the information relating to the actuator 3 exhibiting the highest partial load ratio, which shows the particularly high risk of damage.

In the example shown in FIG. 6, the torque of the shaft 33 of each actuator 3 is used as the physical quantity representing the load. Accordingly, the total load shown is equal to the total of the torques of the shafts 33 of the respective actuators 3 (may be referred to as the total torque). The partial load ratio shown is a percent ratio of the torque of the shaft 33 of the actuator 3 exhibiting the highest partial load ratio to the total torque at a certain timing. In the example shown in FIG. 6, the points plotted on the graph each represent the partial load ratio of any one of the four actuators 3 that exhibits the highest partial load ratio, and thus indicates 25% to 100%, both inclusive. The torque of the shaft 33 of each actuator 3 can be derived based on the amount of strain of the bolt 35 measured by the strain sensor 20.

The display unit 45 displays on the graph a line L1 indicating the upper limit of the allowable partial load ratio for each of the actuators 3, which is determined by the total load. The line L1 can be drawn based on the allowable load on each actuator 3 (may be referred to as the allowable load value). If the torque of the shaft 33 of each actuator 3 is used as the physical quantity representing the load, the allowable load value is, for example, the reference value for the torque of the shaft 33 that is acceptable for each actuator 3. The load on each actuator 3 is represented as the product of the total load and the partial load ratio of the actuator 3. Accordingly, in the graph shown in FIG. 6, the line L1 is a curved line indicating inverse proportion, where the product of the total load and the partial load ratio is equal to the allowable load value. In the graph, the product of the total load and the partial load ratio exceeds the allowable load value in the domain above the line L1 and falls below the allowable load value in the domain below the line L1.

The display unit 45 configured to display the partial load ratio facilitates the understanding of the partial load ratio by the user of the condition monitoring device 1. This enables the user to easily judge the condition of the drive device 2, so that the user can manually control the drive device 2. In particular, one of the actuators 3 may be heavily loaded due to the uneven partial load ratios and the parts of this heavily loaded actuator 3 may experience plastic deformation, but the user can perform control to prevent such deformation.

The actuators 3 may not suddenly receive so high load that their parts may undergo plastic deformation, but one of the actuators 3 may continuously receive a relatively higher load than the other actuators 3. If such is the case, the heavily loaded actuator 3 may get damaged earlier than the others due to fatigue. According to the embodiment, the user can use the display unit 45 to judge the condition of the drive device 2 and control the drive device 2 such that none of the actuators 3 exhibit a particularly higher partial load ratio than the others. With such a design, the present embodiment can prevent any heavily loaded actuator 3 from breaking down earlier than the others due to fatigue. For example, the present embodiment can achieve a uniform load among the respective actuators 3, thereby preventing only one of the actuators 3 from breaking down earlier than the others. Consequently, the present embodiment can achieve an increased lifespan for the entire drive device 2.

Since the information obtained by the obtaining unit 41 is displayed on the graph plotted by taking the partial load ratio along an axis and the total load along another axis, the user can easily understand the partial load ratio and the total load. In addition, the load on each one of the actuators 3 can be known as the product of the total load and the partial load ratio of the actuator 3. With such a design, the user can further accurately understand the condition of the drive device 2, for example, that the total load is not high but one or more of the actuators 3 exhibit a high partial load ratio, or a condition where the total load is high due to a suddenly generated load such as gust of wind, thereby controlling the drive device 2 in an improved manner.

In the present embodiment, the torque of the shaft 33 of each actuator 3 calculated based on the amount of the strain of the bolt 35 is used as the physical quantity representing the load. In this case, the load generated by an external force such as wind, specifically, the load applied on each actuator 3 by an external force while the drive device 2 is suspended can be known. With such a design, the condition monitoring device 1 including the display unit 45 according to the present embodiment is particularly suitable for the drive device 2 of the wind turbine 10, which includes a moving part that may be suspended for a long period of time and which may receive a high external force such as wind as it is located outdoors.

The display unit 45 may also display a line L2 that is a curved line drawn based on a second allowable load value less than the allowable load value used to draw the line L1. The line L2 represents inverse proportion where the product of the total load and the partial load ratio is equal to the second allowable load value. The line L2 can be used as a criterion to determine whether the user should manually control the drive device 2 in a case where a point representing the relation between the total load and the partial load ratio of one of the actuators 3 is below but near the line L1. For example, if a point representing the relation between the total load and the partial load ratio of one of the actuators 3 is plotted between the line L1 and the line L2, the user may determine whether the drive device 2 should be controlled manually as the case may be.

The display unit 45 may display a straight line L3 representing a reference value F for the partial load ratio and a straight line L4 representing a reference value T for the total load. In this case, the reference value F for the partial load ratio depends on the number of actuators included in the drive device 2. The reference value T for the total load depends on the allowable load on each actuator 3. The straight lines L3 and L4 can be used as a criterion to determine whether the user should manually control the drive device 2 in a case where a point representing the relation between the total load and the partial load ratio of one of the actuators 3 is below the line L1 but either the total load or partial load ratio takes a notably large value.

Although not shown, the display unit 45 may display the information obtained by the obtaining unit 41 in such a manner that the information relating to each actuator 3 can be distinguished from the information relating to the other actuators 3. For example, the points relating to the actuators 3-1, 3-2, 3-3 and 3-4 shown in FIG. 2 may be differently shaped so that they can be distinguished from each other. For example, the point relating to the actuator 3-1 can be shaped like a white circle, and the point relating to the actuator 3-2 can be shaped like a black square. Alternatively, the points relating to the actuators 3-1, 3-2, 3-3 and 3-4 shown in FIG. 2 may be differently colored so that they can be distinguished from each other. For example, the point relating to the actuator 3-1 can be colored red, and the point relating to the actuator 3-2 can be colored blue.

Since the information relating to each actuator 3 can be distinguished from the information relating to the other actuators 3, the user of the condition monitoring device 1 can easily know which one of the actuators 3 is represented by a specific point on the graph when looking at the graph.

The diagnosing unit 44 is configured to diagnose the condition of the drive device 2 based on the partial load ratio calculated by the processing unit 42 and output from the output unit 43. For example, the diagnosing unit 44 is configured to diagnose the condition of the actuators 3 of the drive device 2. The diagnosing unit 44 is configured to diagnose the condition of the drive device 2 by comparing the partial load ratio against the reference value F. In this case, the diagnosing unit 44 diagnoses that the drive device 2 does not need to be controlled if the partial load ratio of one of the actuators 3 is equal to or less than the reference value F. On the other hand, the diagnosing unit 44 diagnoses that the drive device 2 needs to be controlled if the partial load ratio of one of the actuators 3 is greater than the reference value F.

The diagnosing unit 44 may diagnose the condition of the drive device 2 by comparing the total load against the reference value T. In this case, the diagnosing unit 44 diagnoses that the drive device 2 does not need to be controlled if the total load is equal to or less than the reference value T. On the other hand, the diagnosing unit 44 diagnoses that the drive device 2 needs to be controlled if the total load is greater than the reference value T. For example, the diagnosing unit 44 is configured to diagnose the condition of each actuator 3 based on the partial load ratio and total load calculated by the processing unit 42.

The diagnosing unit 44 may diagnose the condition of the drive device 2 by comparing the allowable load value against the information obtained by the obtaining unit 41. In this case, the diagnosing unit 44 diagnoses that the drive device 2 does not need to be controlled if the load on one of the actuators is equal to or less than the allowable load value. On the other hand, the diagnosing unit 44 diagnoses that the drive device 2 needs to be controlled if the load on one of the actuators is greater than the allowable load value. For example, the diagnosing unit 44 compares the allowable load value against the product of the total load and the partial load ratio.

In a case where one of the actuators 3 may be heavily loaded due to uneven partial load ratios, the heavily loaded actuator 3 may be damaged. According to the present embodiment, the condition of the drive device 2 can be diagnosed based on the partial load ratios. This design can prevent the actuators 3 from being damaged. Since the load on each one of the actuators 3 is compared against the allowable load value, the diagnosing unit 44 can diagnose that the drive device 2 needs to be controlled either in a case where the total load is not high but one of the actuators 3 exhibits a high partial load ratio or in a case where the total load is high.

The torque of the shaft 33 of each actuator 3 calculated based on the amount of the strain of the bolt 35 can be used as the physical quantity representing the load by the diagnosing unit 44 to diagnose the condition of the drive device 2, as well as by the display unit 45. In this case, the load generated by an external force such as wind, specifically, the load applied on each actuator 3 by an external force while the drive device 2 is suspended can be used to diagnose the condition of the drive device 2. With such a design, the condition monitoring device 1 including the diagnosing unit 44 according to the present embodiment is particularly suitable for the drive device 2 of the wind turbine 10, which includes a moving part that may be suspended for a long period of time and which may receive a high external force such as wind as it is located outdoor.

Based on the diagnosis made by the diagnosing unit 44, the drive control unit 47 controls the drive device 2. The drive control unit 47 controls the drive device 2 such that one of the actuators 3 that exhibits a high partial load ratio can be less loaded. For example, the drive control unit 47 lowers the partial load ratio of the actuator 3 exhibiting the highest partial load ratio, thereby reducing the load on the actuator 3 exhibiting the highest partial load ratio.

In a case where the diagnosing unit 44 diagnoses the condition of the drive device 2 by comparing the partial load ratio of one of the actuators 3 against the reference value F, the drive control unit 47 controls the drive device 2 such that the partial load ratio of the actuator 3 becomes equal to or less than the reference value F. In another case where the diagnosing unit 44 diagnoses the condition of the drive device 2 by comparing the total load against the reference value T, the drive control unit 47 controls the drive device 2 such that the total load becomes equal to or less than the reference value T. In a yet another case where the diagnosing unit 44 diagnoses the condition of the drive device 2 by comparing the load on one of the actuators 3 against the allowable load value, the drive control unit 47 controls the drive device 2 such that the load on the actuator 3 becomes equal to or less than the allowable load value.

The following describes a specific example of how control is performed by the drive control unit 47. While the drive device 2 is in operation, the drive control unit 47 controls the drive device 2 such that the drive device 2 is suspended if the diagnosing unit 44 diagnoses that the drive device 2 needs to be controlled. Based on the diagnosis made by the diagnosing unit 44, the drive control unit 47 may control the brake configured to apply a brake force to the actuators 3. For example, in a case where the diagnosing unit 44 diagnoses that the actuators 3 need to be controlled and while the brake is applying the brake force to the actuators 3, the drive control unit 47 may increase or decrease the brake force applied by the brake to any one of the actuators 3. In this manner, in an example case where an external force such as wind applies a high load on the actuators 3, the load on the actuators 3 can be reduced while the tower 102 can be still allowed to rotate relative to the nacelle 103 in response to an external force. The suspension of the driving and the controlling of the brake may be combined.

The user terminal 5 is a workstation, a personal computer, a tablet device, or a smartphone device. The user terminal 5 is installed, for example, in a company building where a user of the wind turbine 10 stays. The user terminal 5 is capable of communicating with the output device 4 and the controller 40 via the communication line 100.

The following now describes a drive device condition monitoring method using the above-described condition monitoring device 1 and an output method using the above-described output device 4. In an obtaining step, the obtaining unit 41 obtains the information relating to the load applied to each of the actuators 3. In the subsequent processing step, the processing unit 42 calculates the partial load ratio of each actuator 3 based on the information obtained in the obtaining step. In the following outputting step, the output unit 43 outputs the partial load ratio.

In the next diagnosing step, the diagnosing unit 44 diagnoses the condition of the drive device 2 based on the partial load ratio calculated in the processing step and output in the outputting step. Specifically, the diagnosing unit 44 diagnoses the condition of the actuators 3. Alternatively, the diagnosing unit 44 diagnoses whether the drive device 2 needs to be controlled. If the diagnosing unit 44 diagnoses that the drive device 2 does not need to be controlled, the obtaining step by the obtaining unit 41 is performed again so that the condition monitoring can be continued.

If the diagnosing unit 44 diagnoses that the drive device 2 needs to be controlled, a controlling step is performed, where the drive control unit 47 controls the drive device 2 based on the diagnosis made in the diagnosing step. For example, in the driving controlling step, the brake for applying a brake force to the actuators 3 is controlled based on the diagnosis made in the diagnosing step.

In addition, the display unit 45 displays the partial load ratios calculated in the processing step and output in the outputting step. The display unit 45 displays a graph plotting points each representing the partial load ratio of one of the actuators 3 at a specific timing, as shown in FIG. 6, for example. For example, every time the information relating to the load is obtained in the obtaining step and the partial load ratio is output in the outputting step, the display unit 45 adds, to the displayed graph, a point representing the newly output partial load ratio. In this case, the user of the condition monitoring device 1 can easily know the newly output partial load ratio real-time and perform control manually.

While the foregoing has described the embodiment with reference to specific examples, these specific examples are not intended to limit the embodiment. The foregoing embodiment can be implemented in various other specific forms and is susceptible to omission, replacement, and modification of various elements thereof within the purport of the invention.

With reference to the appended drawings, the following describes a modification example. In the following description and the drawings used therein, parts that can be configured in a similar manner to those in the foregoing specific example are denoted by the same reference signs as those in the foregoing specific example and are not described again.

Modification Example

Figure 7:
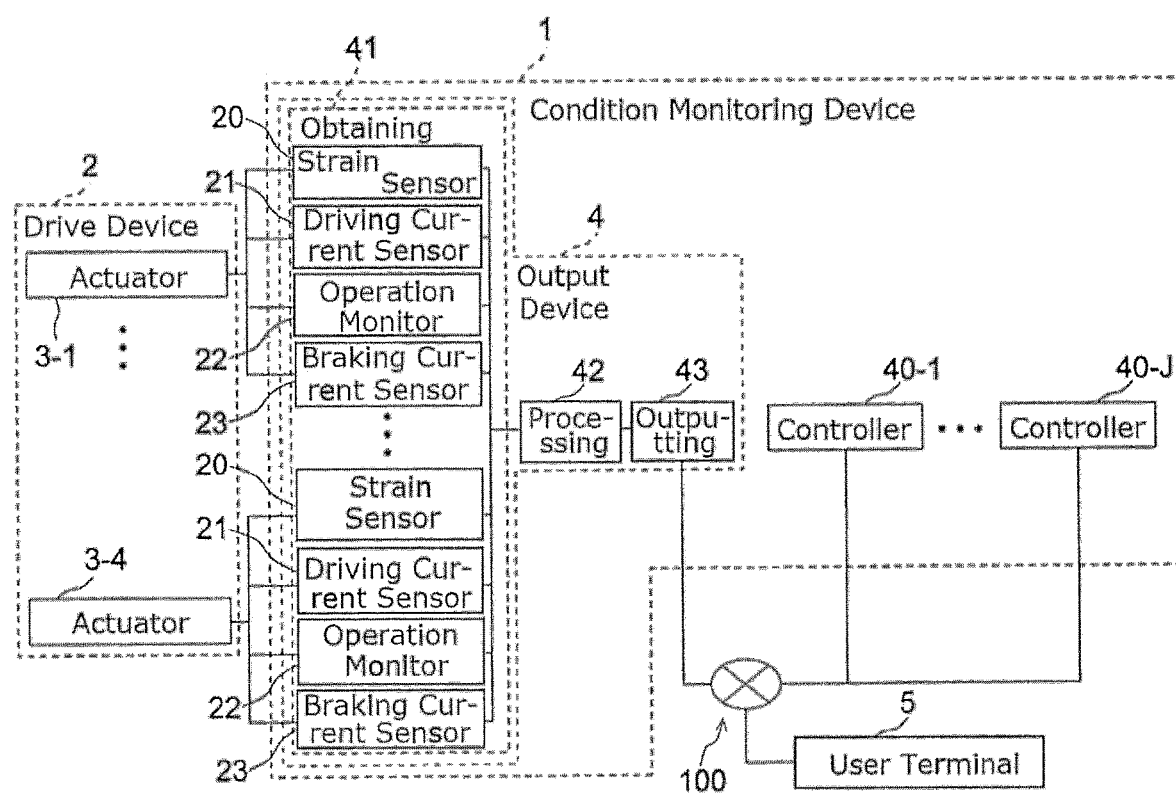
FIG. 7 illustrates an example configuration of a condition monitoring device according to a modification example.

In the above-described embodiment, a single controller 40 includes the diagnosing unit 44, the display unit 45, the drive control unit 47, the communicating unit 48 and the storage unit 49. However, the condition monitoring device 1 is not limited to such. FIG. 7 illustrates an example configuration of the condition monitoring device 1 according to a modification example. The condition monitoring device 1 shown in FIG. 7 includes the output device 4, the obtaining unit 41 and a plurality of controllers 40.

The plurality of controllers 40 are distributed via the communication line 100. The functional units (for example, the diagnosing and drive control units 44 and 47) of each controller 40 may be distributed. The plurality of controllers 40 implement cloud computing by communicating with each other via the communication line 100. The plurality of controllers 40 can perform the above-described diagnosing and controlling steps through, for example, cloud computing.

Aspects of the invention are not limited to the foregoing embodiments and embrace various modifications conceivable by those skilled in the art. Advantageous effects of the invention are also not limited to those described above. That is, various additions, changes, and partial deletions are possible in a range of not departing from the conceptual ideas and spirit of the present invention derived from contents defined in the claims and the equivalents thereof.

What is claimed is:

1. A condition monitoring device for a drive device of a wind turbine, the condition monitoring device comprising:
one or more sensors, the one or more sensors operatively connected to the drive device of the wind turbine and configured to sense information relating to a load applied to each of a plurality of actuators, the plurality of actuators being included in the drive device of the wind turbine and configured to cooperate with each other;
a brake configured to apply a braking force to the plurality of actuators;
a controller having a processor, the controller operatively connected to the drive device of the wind turbine and the one or more sensors, the controller being configured to:
obtain the information from the one or more sensors;
based on the obtained information, calculate a partial load ratio, the partial load ratio representing a ratio of the load on each of the plurality of actuators to a total load, the total load being a sum of the loads on the plurality of actuators;
diagnose a condition of each of the plurality of actuators based on the total load and the calculated partial load ratio;
determine an action to be taken based on the diagnosed condition; and
control the brake based on the diagnosed condition.

2. The condition monitoring device of claim 1, wherein the one or more sensors includes a torque sensor.

3. The condition monitoring device of claim 2, further comprises a display configured to display the obtained information using a graph plotted by taking the partial load ratio along an axis and the total load along another axis.

4. The condition monitoring device of claim 3, wherein the display is configured to display on the graph a line indicating an upper limit of an allowable partial load ratio for each of the plurality of actuators determined by the total load.

5. The condition monitoring device of claim 1, further comprises a display configured to display the obtained information using a graph plotted by taking the partial load ratio along an axis and the total load along another axis.

6. The condition monitoring device of claim 5, wherein the display is configured to display on the graph a line indicating an upper limit of an allowable partial load ratio for each of the plurality of actuators determined by the total load.

7. A wind turbine comprising:
a drive device including a plurality of actuators configured to cooperate with each other;
a wind turbine body including a moving part configured to be driven by the drive device; and
a condition monitoring device for the drive device of the wind turbine, the condition monitoring device including:
one or more sensors, the one or more sensors operatively connected to the drive device of the wind turbine and configured to sense information relating to a load applied to each of the plurality of actuators;
a controller having a processor, the controller operatively connected to the drive device of the wind turbine and the one or more sensors, the controller being configured to:
obtain the information relating to a load applied to each of the plurality of actuators;
based on the obtained information, calculate a partial load ratio, the partial load ratio representing a ratio of a load on each of the plurality of actuators to a total load, the total load being a sum of the loads on the plurality of actuators;
diagnose a condition of the drive device based on the partial load ratio; and
control the drive device based on the diagnosed condition.

8. A condition monitoring method for a drive device of a wind turbine, the condition monitoring method comprising steps of:
obtaining information relating to a load applied to each of a plurality of actuators, the plurality of actuators being included in the drive device of the wind turbine and configured to cooperate with each other;
based on the information obtained in the obtaining step, calculating a partial load ratio, the partial load ratio representing a ratio of a load on each of the plurality of actuators to a total load, the total load being a sum of the loads on the plurality of actuators; and
diagnosing a condition of each of the plurality of actuators based on the total load and the partial load ratio calculated in the calculating step; and
based on a diagnosis made in the diagnosing step, controlling the drive device of the wind turbine.

9. The condition monitoring method of claim 8, wherein, in the controlling step, a brake for applying a brake force to the plurality of actuators is controlled based on the diagnosis made in the diagnosing step.

* * * * *